Dec. 19, 1922.
F. F. CHANDLER ET AL.
TRACTOR.
ORIGINAL FILED JUNE 14, 1917.
1,439,066.
3 SHEETS—SHEET 1.
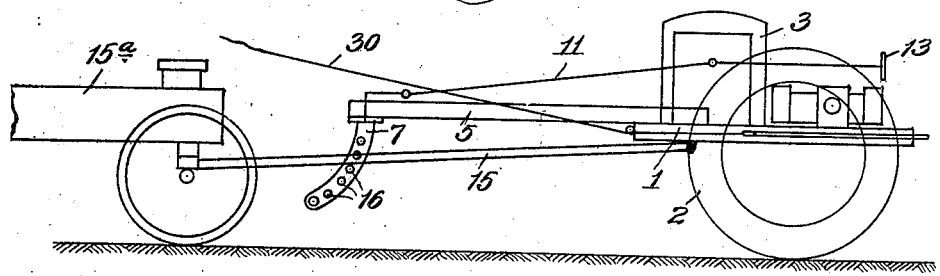
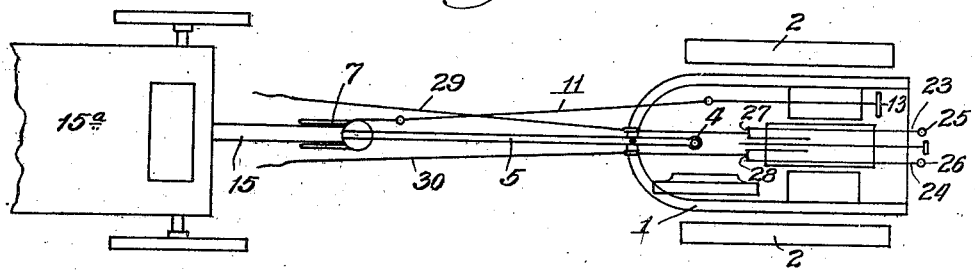
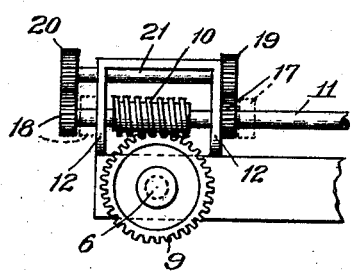
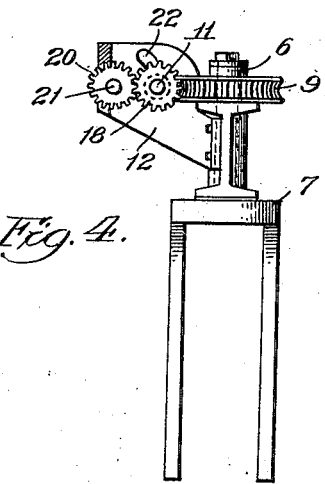
Witness:
John Enders
Merrill M. Blackburn
Inventors.
F. F. Chandler &
H. G. Myers,
by Wallace R. Lane
Atty.

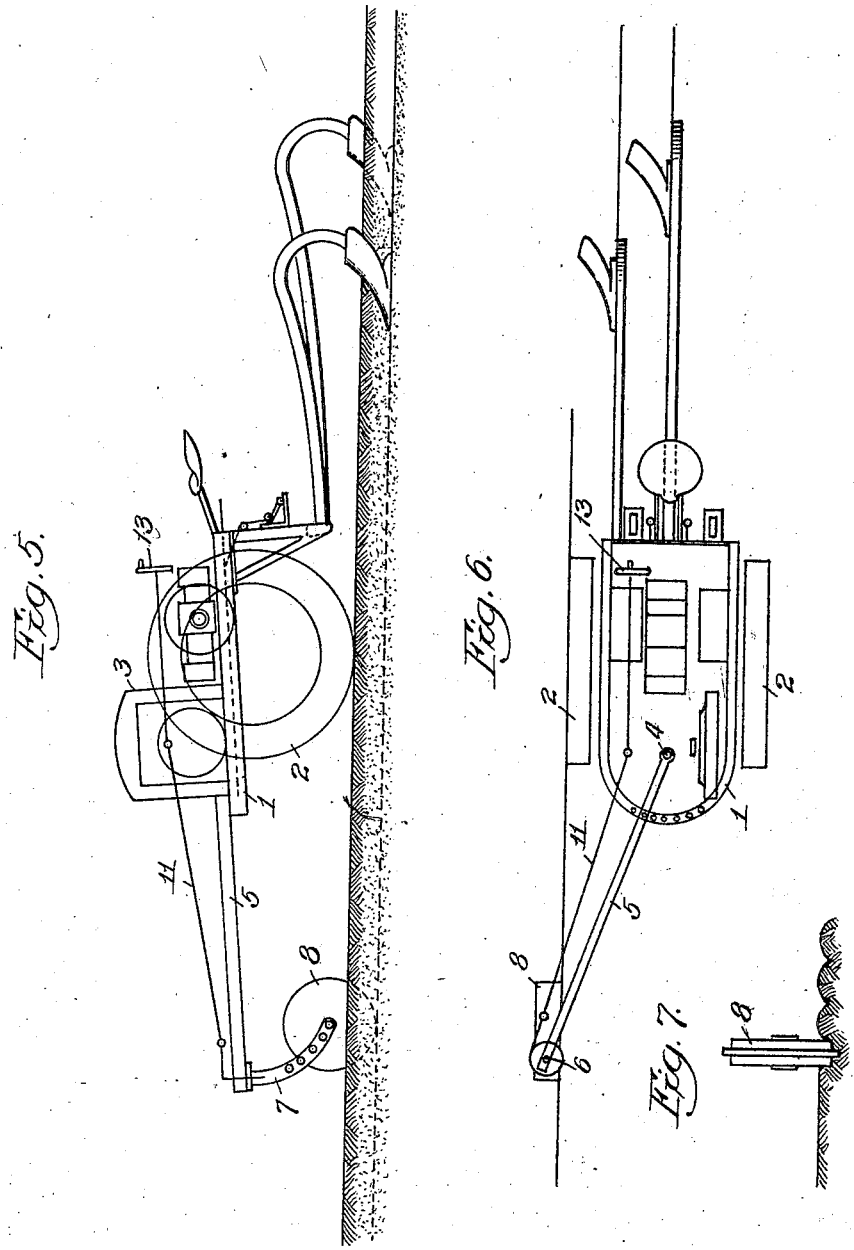

Dec. 19, 1922.
F. F. CHANDLER ET AL.
TRACTOR.
ORIGINAL FILED JUNE 14, 1917.
1,439,066.
3 SHEETS—SHEET 3.
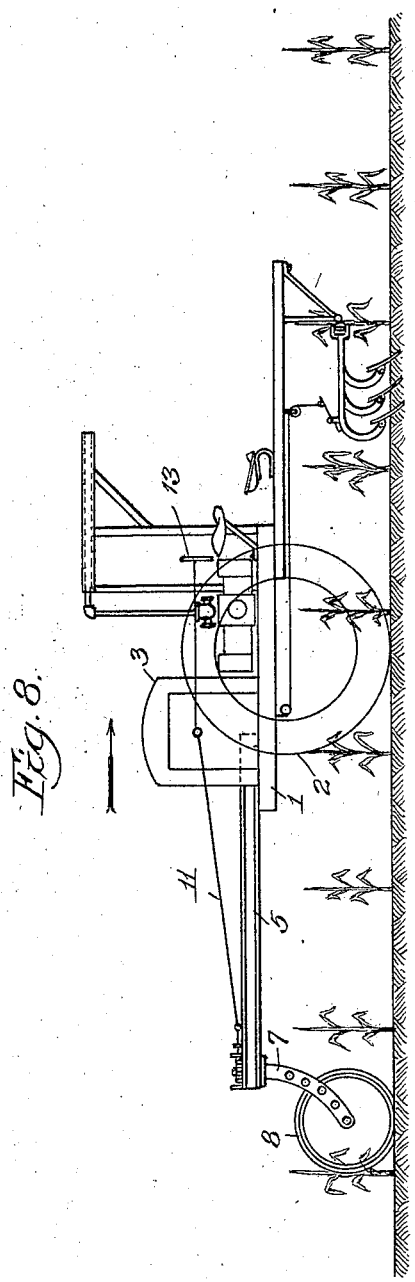
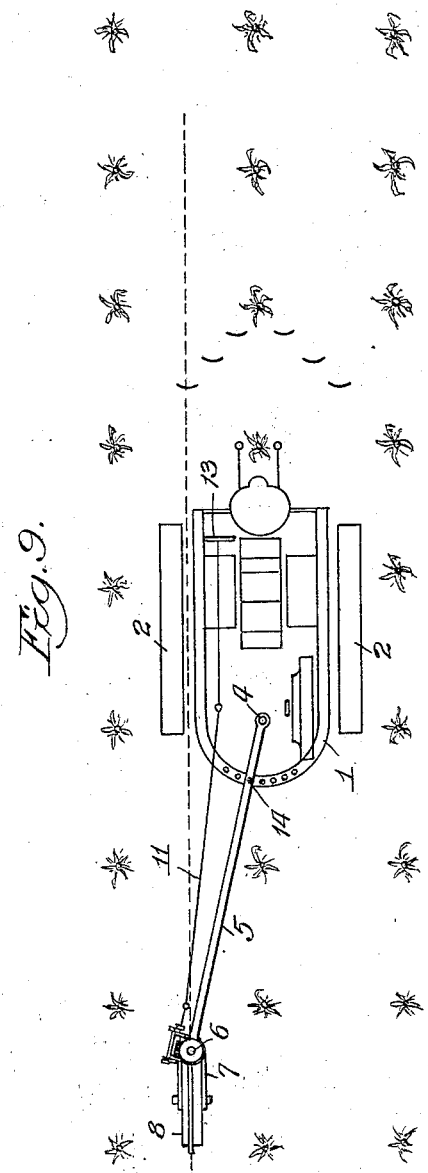
Witness:
John Enders
Merrill M. Blackburn
Inventors.
F. F. Chandler
H. G. Myers,
by Wallace R. Lane
Atty Patented Dec. 19, 1922.                                                                                          1,439,066

UNITED STATES PATENT OFFICE.

FRANKLIN F. CHANDLER AND HENRY G. MYERS, OF INDIANAPOLIS, INDIANA, ASSIGNORS TO ADAPTABLE TRACTOR CO., OF INDIANAPOLIS, INDIANA, A CORPORATION OF INDIANA.

TRACTOR.

Original application filed June 14, 1917, Serial No. 174,675. Divided and this application filed September 22, 1920. Serial No. 412,043.

*To all whom it may concern:*

Be it known that we, FRANKLIN F. CHANDLER and HENRY G. MYERS, citizens of the United States, residing at Indianapolis, in the county of Marion and State of Indiana, have invented certain new and useful Improvements in Tractors, of which the following is the specification.

This invention relates to a tractor which possesses great flexibility of control, and which will readily and quickly respond to the will of the operator whether driven from the tractor or elsewhere, and being not only sufficiently small to be capable of general use around a farm, but also possessed of sufficient power to accomplish many kinds of heavy work.

One of the objects of this invention is to provide a tractor of improved design in which the bulk of the weight is substantially located over the two drive wheels with the remainder of the weight carried at the end of a tail beam by a swinging caster wheel.

Another object of the invention is to provide a tractor which can be easily and quickly attached to a wagon, plow, cultivator, or the like, for moving the same, or which can be instantly transformed into a stationary power plant for the accomplishment of various kinds of work around the farm or elsewhere, such as sawing wood, driving cream separators, corn shellers, sewers, churns, wells, shredders, and the like.

A still further object of this invention is the provision of an improved tractor which can be hitched to a wagon tongue or the like, and be driven either from the wagon seat by means of lines or reins in a manner similar to driving a horse, or from the tractor by means of handles, lines, or foot pedals, as desired.

Another object of this invention is to provide a steering mechanism for the tractor of such nature that the caster wheel may either be positively steered or be allowed to swing free, as desired.

A still further object is such an arrangement of tail beam that the caster wheel may be carried on either side of the center line of the machine or any intermediate position, as desired.

A further object of this invention is to provide such a combination, construction, and arrangement of parts as will result in a simple, easily operated, efficacious and economical device.

Our invention further resides in the combination, construction, and arrangement of parts illustrated in the accompanying drawings, and while we have shown therein a preferred embodiment, we desire the same to be understood as illustrative only and not as limiting our invention.

In the drawings, Fig. 1 is a diagrammatic elevation of our improved tractor showing its application in the work of drawing a wagon.

Fig. 2 is a plan view of the device shown in Fig. 1.

Fig. 3 is a detail plan view showing the arrangement of the steering mechanism for the caster wheel.

Fig. 4 is an end elevation thereof.

Fig. 5 is a diagrammatic elevation showing the application of our tractor to the work of drawing a plurality of plows.

Fig. 6 is a plan view of the device shown in Fig. 5.

Fig. 7 is a fragmentary view showing the caster wheel tracking in a furrow.

Fig. 8 is a diagrammatic view in elevation, showing our device as applied to the work of operating a cultivator.

Fig. 9 is a plan view thereof.

Referring more in detail to the drawings numeral 1 indicates a tractor frame supported upon a pair of wheels 2 and provided with an engine 3. Pivoted to the tractor at 4 is a tail beam 5 having pivoted therein as at 6 a member 7, here shown as a yoke member. As shown in Figs. 5 to 9 this yoke member has mounted therein a caster wheel 8 which may be removed so that the tractor may be attached to the tongue or comparable portion of a wagon or other structure as shown for exmaple in Figs. 1 and 2.

Secured to the upper portion of the spindle of the yoke 7 is a worm wheel 9 adapted to be driven by a worm 10 mounted on a shaft 11, which is supported in a frame 12 secured to the end of the tail beam 5. The sections of the shaft 11 are connected by universal joints and said shaft has upon its free end a hand wheel 13 by means of which the position of the caster wheel may be controlled in an obvious manner. It will be apparent from Fig. 9 that for some operations it will be necessary to swing the tail beam 5 to right or left and fasten the same in position. It will also be evident that this can be done by passing a bolt or similar fastening means 14 through holes in the tail piece and frame 1 respectively.

As stated above, yoke 7 is pivoted in tail beam 5 and may, if desired, be swung entirely around or through any desired angle. This makes it possible to attach the tractor to a wagon as in Fig. 1 or, when the tongue of the drawn vehicle is short, to turn the yoke through 180° from this position and attach said vehicle with the yoke 7 in the position shown in Fig. 5.

Mounted on the rod 11 and rigidly secured thereto are the pinions 17 and 18 which may mesh with pinions 19 and 20, rigidly secured to the ends of a shaft 21 which is non-rotatably mounted in the yoke 12. The sides of yoke 12 are provided with slots 22 concentrically located with respect to shaft 21 and so placed that when shaft 11, carrying worm 10, is in its lower position said worm is in engagement with the periphery of the worm wheel 9. If gears 17 and 18 occupy the positions shown by dotted lines in Fig. 3 and shaft 11 is rotated, worm 10 will cause the rotation of worm wheel 9 and consequently cause member 7 to change the direction of the caster wheel 8, thereby causing the vehicle to be steered. If it is desired that the caster wheel shall turn freely and not be under the control of the hand wheel 13, it is merely necessary that rod or shaft 11 be pushed into such position that gears 17 and 18 occupy the positions shown by solid lines in Fig. 3 and then rotate the hand wheel 13. When this is done gears 17 and 18 will travel up on gears 19 and 20, shaft 11 moving upwardly in slot 22. This will disengage worm 10 from worm wheel 9, permitting the latter and the caster wheel 8 to turn freely.

Referring now to Figs. 1 and 2 it will be seen that the tongue or comparable structure 15 of a vehicle 15ª may be secured to the projection 7, whether this be a yoke, a bracket or other equivalent structure, and may have another point thereof secured to the tractor frame or to the tail beam 5. In the structure shown the tongue 15 has its forward end connected to the frame of the tractor substantially in line with the pivot point 4 and is retained within the yoke 7 by passing a bolt or bolts through the holes 16 in the sides of the yoke.

Control rods 23 and 24, by means of which the operation of the machine is controlled, have secured to their free ends control handles 25 and 26 for direct manual actuation. Connected to these control rods as at 27 and 28 are lines or reins 29 and 30 by means of which an operator upon vehicle 15ª, or in that vicinity, can control the tractor as if located at the opposite end thereof.

Certain structure disclosed but not claimed herein is claimed in our co-pending application Serial No. 174,675 allowed May 17th 1920, and patented December 14, 1920, No. 1,361,964, of which this is a division.

It is of course understood that the specific description of structure set forth above may be departed from without departing from the spirit of our invention as set forth in this specification and the appended claims.

Having now described our invention, we claim:

1. In a tractor, a caster wheel, a yoke for said wheel, a gear on said yoke, a worm gear engaging said first mentioned gear, a bracket, a slot in said bracket, a fixed gear mounted in said bracket, a rod upon which said worm gear is slidably keyed, said rod passing through said slot, a pinion rigidly keyed upon said rod, and means for rotating and longitudinally moving said rod, whereby upon moving said rod endwise said pinion will be thrown into engagement with said fixed gear, which upon rotation of said rod will cause said rod to move upwardly in said slot and disengage said worm gear from said first mentioned gear.

2. In a tractor, a body portion, a tail beam pivotally secured to said body portion, a yoke on the free end of said tail beam, a caster wheel in said yoke, said caster wheel being removable from said yoke, whereby a vehicle tongue can be quickly inserted into said yoke and means for securing such tongue in said yoke.

3. In a tractor, a body portion, a tail beam pivotally secured to said body portion, a yoke on the free end of said tail beam, a caster wheel in said yoke, said caster wheel being removable from said yoke, whereby a vehicle tongue can be quickly inserted into said yoke, means for securing said tongue in said yoke, controlling means on said body portion, and means connected with said controlling means whereby the operation of said tractor may be controlled from the seat of a vehicle drawn by said tractor.

4. In a tractor, a frame work, a pair of drive wheels, means for driving said wheels either forward or backward at the same or varying speeds, means on said frame for controlling said movement of the wheels, a beam secured to said body portion, a yoke on said beam, a caster wheel in said yoke and removable therefrom, whereby a vehicle tongue can be quickly inserted into said yoke, means for securing such tongue in said yoke, and means for operating said controlling means from the seat of a wagon or other vehicle attached to said tractor, whereby said tractor may be driven as a horse.

5. In a tractor, a body portion, a tail beam pivotally connected to said body portion, a yoke on the free end of said tail beam having a plurality of aligned perforations formed in the arms thereof, a caster wheel in said yoke, said caster wheel being removable from said yoke, whereby a vehicle tongue can be quickly inserted into said yoke and secured to said body portion, securing means being passed through the perforations in said yoke to hold the tongue and yoke in proper relative positions.

6. In a tractor, a body portion, a tail beam pivotally connected to said body portion, a depending arm on the free end of said tail beam, a caster wheel rotatably secured to said arm and removable therefrom to permit a vehicle tongue to be quickly attached to said arm, and means for detachably securing said tongue to said arm.

7. In a tractor, a body portion, a tail beam connected to said body portion, a depending arm on said tail beam adapted to removably receive a caster wheel, means on said tractor for attaching draft rigging of a vehicle or implement to be drawn, said depending arm having means for detachably securing it to a portion of the vehicle or implement to complete the hitch and cause the same to properly coordinate with the movements of the tractor.

8. In a tractor, a body portion, a tail beam pivotally connected to said body portion, a depending arm on said tail beam, a caster wheel rotatably mounted on said arm and removable therefrom to permit a cross beam, bar, tongue or the like, of a vehicle, or implement, to be drawn, to be quickly attached to said arm, and means for detachably securing the same to said arm.

9. In a tractor, a body portion, a tail beam pivotally connected to said body portion, a depending angularly extending arm carried by said beam, means for securing said arm to an implement to be drawn, the connection between said arm and said beam being swivel whereby said arm may be swung to extend either forwardly or rearwardly to permit the drawn implement to be secured closer to or farther away from the tractor as desired.

10. In a tractor, a body portion, a tail beam pivotally connected to said body portion, a depending angularly extending arm carried by said beam, means for securing said arm to an implement to be drawn, the connection between said arm and said beam being swivel whereby said arm may be swung to extend either forwardly or rearwardly to permit the drawn implement to be secured closer to or farther away from the tractor as desired, said arm securing means permitting a sufficient movement of the element to which it is secured to accommodate inequalities in the road, thus preventing any substantial turning of the swivelled depending arm after being hitched.

11. In a tractor, a body portion, a tail beam pivotally connected to said body portion, a depending arm on said tail beam, a caster wheel rotatably mounted on said arm and removable therefrom, to permit a cross beam, bar, tongue, or the like, of a vehicle, or implement to be drawn, to be quickly attached to said arm, and means for detachably securing the same to said arm, said arm securing means permitting a sufficient movement of the element to which it is secured to accommodate inequalities in the road, but preventing any substantial turning of the swivelled depending arm after being hitched.

In witness whereof, we hereunto subscribe our names to this specification.

FRANKLIN F. CHANDLER.
HENRY G. MYERS.